United States Patent
Belov et al.

(10) Patent No.: US 11,381,464 B2
(45) Date of Patent: Jul. 5, 2022

(54) METHODS, SYSTEMS, AND COMPUTER READABLE MEDIA FOR IMPLEMENTING A GENERALIZED MODEL FOR DEFINING APPLICATION STATE MACHINES

(71) Applicants: Keysight Technologies, Inc., Santa Rosa, CA (US); Keysight Technologies RO SRL, Bucharest (RO)

(72) Inventors: Konstantin Belov, Thousand Oaks, CA (US); Partha Majumdar, Woodland Hills, CA (US); Tiberiu Viorel Barbu, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 310 days.

(21) Appl. No.: 16/699,358

(22) Filed: Nov. 29, 2019

(65) Prior Publication Data

US 2021/0165672 A1 Jun. 3, 2021

(51) Int. Cl.
*G06F 9/44* (2018.01)
*H04L 41/14* (2022.01)
(Continued)

(52) U.S. Cl.
CPC .............. *H04L 41/145* (2013.01); *G06F 8/38* (2013.01); *G06F 9/30087* (2013.01);
(Continued)

(58) Field of Classification Search
CPC .... H04L 43/0805; H04L 41/145; G06F 11/26; G06F 8/38; G06F 9/4498; G06F 9/30087; G06F 9/3885; G06F 9/542; G06F 9/546; G06F 16/95; G06F 9/45508; G06Q 10/067; G06Q 10/06
See application file for complete search history.

(56) References Cited

U.S. PATENT DOCUMENTS 5,247,517 A 9/1993 Ross et al.
5,327,437 A 7/1994 Balzer
(Continued)

FOREIGN PATENT DOCUMENTS

EP 0895375 B1 8/2004

OTHER PUBLICATIONS

Notice of Allowance and Fee(s) Due for U.S. Appl. No. 13/718,813 (dated Mar. 17, 2016).
(Continued)

*Primary Examiner* — Tuan A Vu (57) ABSTRACT

Methods, systems, and computer readable media for testing and modeling the beamforming capabilities of a device under test (DUT) are disclosed. The method includes receiving, from a DUT, system information that correlates a plurality of resources to a plurality of synchronization system (SS) blocks transmitted by the DUT and receiving, from the DUT, the plurality of SS blocks. In response to receiving the plurality of SS blocks, the method further includes sending a random access procedure (RACH) message from an emulated user equipment to the DUT via a resource that is correlated per the system information to a predefined SS block that is specified in a beam model. The method also includes analyzing a beam switch indication message sent by the DUT to confirm that the DUT has restricted communication to the emulated user equipment via a beam signal corresponding to the predefined SS block.

20 Claims, 7 Drawing Sheets

(51) Int. Cl.
  *G06F 9/455* (2018.01)
  *G06F 9/448* (2018.01)
  *G06F 9/30* (2018.01)
  *H04L 43/0805* (2022.01)
  *G06F 9/54* (2006.01)
  *G06F 9/38* (2018.01)
  *G06Q 10/06* (2012.01)
  *G06F 8/38* (2018.01)
  *G06F 16/95* (2019.01)
  *G06F 11/26* (2006.01)

(52) U.S. Cl.
  CPC .......... *G06F 9/3885* (2013.01); *G06F 9/4498* (2018.02); *G06F 9/45508* (2013.01); *G06F 9/542* (2013.01); *G06F 9/546* (2013.01); *G06F 16/95* (2019.01); *G06Q 10/06* (2013.01); *G06Q 10/067* (2013.01); *H04L 43/0805* (2013.01); *G06F 11/26* (2013.01)

(56) References Cited

U.S. PATENT DOCUMENTS

| | | |
|---|---|---|
| 5,343,463 A | 8/1994 | van Tetering et al. |
| 5,477,531 A | 12/1995 | McKee |
| 5,535,338 A | 7/1996 | Krause et al. |
| 5,568,471 A | 10/1996 | Hershey et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |
| 5,761,486 A | 6/1998 | Watanabe |
| 5,787,253 A | 7/1998 | McCreery et al. |
| 5,838,919 A | 11/1998 | Schwaller et al. |
| 5,850,386 A | 12/1998 | Anderson et al. |
| 5,878,032 A | 3/1999 | Mirek et al. |
| 5,881,237 A | 3/1999 | Schwaller et al. |
| 5,905,713 A | 5/1999 | Anderson et al. |
| 5,937,165 A | 8/1999 | Schwaller et al. |
| 5,974,237 A | 10/1999 | Shurmer et al. |
| 6,028,847 A | 2/2000 | Beanland |
| 6,044,091 A | 3/2000 | Kim |
| 6,061,725 A | 5/2000 | Schwaller et al. |
| 6,065,137 A | 5/2000 | Dunsmore et al. |
| 6,108,800 A | 8/2000 | Asawa |
| 6,122,670 A | 9/2000 | Bennett et al. |
| 6,148,277 A | 11/2000 | Asava |
| 6,157,955 A | 12/2000 | Narad et al. |
| 6,172,989 B1 | 1/2001 | Yanagihara et al. |
| 6,173,333 B1 | 1/2001 | Jolitz |
| 6,189,031 B1 | 2/2001 | Badger |
| 6,233,256 B1 | 5/2001 | Dieterich et al. |
| 6,279,124 B1 | 8/2001 | Brouwer |
| 6,321,264 B1 | 11/2001 | Fletcher |
| 6,345,302 B1 | 2/2002 | Bennett et al. |
| 6,360,332 B1 | 3/2002 | Weinberg |
| 6,363,056 B1 | 3/2002 | Beigi et al. |
| 6,397,359 B1 | 5/2002 | Chandra et al. |
| 6,401,117 B1 | 6/2002 | Narad |
| 6,408,335 B1 | 6/2002 | Schwaller et al. |
| 6,421,730 B1 | 7/2002 | Narad |
| 6,434,513 B1 | 8/2002 | Sherman et al. |
| 6,446,121 B1 | 9/2002 | Shah |
| 6,507,923 B1 | 1/2003 | Wall et al. |
| 6,545,979 B1 | 4/2003 | Poulin |
| 6,601,098 B1 | 7/2003 | Case |
| 6,621,805 B1 | 9/2003 | Kondylis et al. |
| 6,625,648 B1 | 9/2003 | Schwaller et al. |
| 6,625,689 B2 | 9/2003 | Narad |
| 6,662,227 B2 | 12/2003 | Boyd et al. |
| 6,708,224 B1 | 3/2004 | Tsun et al. |
| 6,763,380 B1 | 7/2004 | Mayton et al. |
| 6,789,100 B2 | 9/2004 | Nemirovsky |
| 6,920,407 B2 | 7/2005 | Adamian et al. |
| 6,950,405 B2 | 9/2005 | Van Gerrevink |
| 6,996,772 B2 | 2/2006 | Justice et al. |
| 7,006,963 B1 | 2/2006 | Maurer |
| 7,010,782 B2 | 3/2006 | Narayan et al. |
| 7,516,216 B2 | 4/2009 | Ginsberg et al. |
| 7,543,054 B1 | 6/2009 | Bansod et al. |
| 7,765,313 B2 | 7/2010 | Jain et al. |
| 8,010,469 B2 | 8/2011 | Kapoor et al. |
| 8,023,410 B2 | 9/2011 | O'Neill |
| 8,135,657 B2 | 3/2012 | Kapoor et al. |
| 8,145,949 B2 | 3/2012 | Silver |
| 8,341,462 B2 | 12/2012 | Broda et al. |
| 8,402,313 B1 | 3/2013 | Pleis et al. |
| 8,447,839 B2 | 5/2013 | Jiang et al. |
| 8,510,600 B2 | 8/2013 | Broda et al. |
| 8,522,089 B2 | 8/2013 | Jindal |
| 8,601,585 B2 | 12/2013 | Beddoe et al. |
| 8,676,188 B2 | 3/2014 | Olgaard |
| 8,839,035 B1 | 9/2014 | Dimitrovich et al. |
| 9,043,746 B2 | 5/2015 | Rabinovich et al. |
| 9,065,556 B2 | 6/2015 | Popescu et al. |
| 9,075,735 B2 | 7/2015 | Tomlinson et al. |
| 9,116,873 B2 | 8/2015 | Majumdar et al. |
| 9,131,000 B2 | 9/2015 | Iyer |
| 9,178,790 B2 | 11/2015 | Majumdar et al. |
| 9,178,823 B2 | 11/2015 | Majumdar et al. |
| 9,397,901 B2 | 7/2016 | Majumdar et al. |
| 9,578,441 B2 | 2/2017 | Gerber et al. |
| 2002/0080781 A1 | 6/2002 | Gustavsson |
| 2003/0009544 A1 | 1/2003 | Wach |
| 2003/0012141 A1 | 1/2003 | Gerrevink |
| 2003/0033406 A1 | 2/2003 | Rekesh et al. |
| 2003/0043434 A1 | 3/2003 | Brachmann et al. |
| 2003/0231741 A1 | 12/2003 | Rancu et al. |
| 2005/0022012 A1 | 1/2005 | Bluestone et al. |
| 2006/0242499 A1 | 10/2006 | Volz |
| 2006/0268933 A1 | 11/2006 | Kellerer et al. |
| 2008/0285467 A1 | 11/2008 | Olgaard |
| 2008/0298380 A1 | 12/2008 | Rittmeyer et al. |
| 2009/0100296 A1 | 4/2009 | Srinivasan et al. |
| 2009/0100297 A1 | 4/2009 | Srinivasan et al. |
| 2009/0112668 A1* | 4/2009 | Abu El Ata ........... G06Q 10/06 705/7.27 |
| 2010/0050040 A1 | 2/2010 | Samuels et al. |
| 2011/0238855 A1 | 9/2011 | Korsunsky et al. |
| 2011/0283247 A1 | 11/2011 | Ho et al. |
| 2012/0144226 A1 | 6/2012 | Yang et al. |
| 2012/0192021 A1 | 7/2012 | Jindal |
| 2012/0240185 A1 | 9/2012 | Kapoor et al. |
| 2012/0314576 A1 | 12/2012 | Hasegawa et al. |
| 2013/0006567 A1 | 1/2013 | Horn |
| 2013/0060735 A1 | 3/2013 | Haddy et al. |
| 2013/0111257 A1 | 5/2013 | Broda et al. |
| 2013/0208600 A1 | 8/2013 | Campbell et al. |
| 2013/0227092 A1 | 8/2013 | Maestas |
| 2013/0275606 A1 | 10/2013 | Iyer |
| 2013/0286860 A1 | 10/2013 | Dorenbosch et al. |
| 2013/0346719 A1 | 12/2013 | Tomlinson et al. |
| 2014/0036700 A1 | 2/2014 | Majumdar et al. |
| 2014/0100297 A1 | 4/2014 | Gruskin et al. |
| 2014/0115394 A1* | 4/2014 | Fattah .................... G06F 11/26 714/32 |
| 2014/0160927 A1 | 6/2014 | Majumdar et al. |
| 2014/0169177 A1 | 6/2014 | Popescu et al. |
| 2014/0173094 A1 | 6/2014 | Majumdar et al. |
| 2014/0289561 A1 | 9/2014 | Majumdar et al. |
| 2016/0094497 A1* | 3/2016 | Javed .................... G06F 16/95 709/206 |
| 2016/0218884 A1* | 7/2016 | Ebrom .................... G06F 8/38 |
| 2017/0255884 A1* | 9/2017 | Visvanathan ........ G06Q 10/067 |

OTHER PUBLICATIONS

Final Office Action for U.S. Appl. No. 13/718,813 (dated Sep. 1, 2015).

Notice of Allowance and Fee(s) Due for U.S. Appl. No. 13/447,160 (dated Apr. 30, 2015).

Applicant-Initiated Interview Summary for U.S. Appl. No. 13/447,160 (dated Mar. 26, 2015).

(56) References Cited

OTHER PUBLICATIONS

Advisory Action for U.S. Appl. No. 13/447,160 (dated Mar. 5, 2015).
Notice of Allowance and Fee(s) Due for U.S. Appl. No. 13/716,077 (dated Feb. 20, 2015).
Non-Final Office Action for U.S. Appl. No. 13/718,813 (dated Jan. 14, 2015).
Final Office Action for U.S. Appl. No. 13/447,160 (dated Dec. 19, 2014).
Non-Final Office Action for U.S. Appl. No. 13/716,077 (dated Sep. 24, 2014).
Non-Final Office Action for U.S. Appl. No. 13/447,160 (dated Jul. 10, 2014).
Advisory Action for U.S. Appl. No. 13/447,160 (dated May 29, 2014).
Applicant-Initiated Interview Summary for U.S. Appl. No. 13/447,160 (dated May 23, 2014).
Final Office Action for U.S. Appl. No. 13/447,160 (dated Mar. 18, 2014).
Interview Summary for U.S. Appl. No. 13/447,160 (dated Feb. 25, 2014).
Non-Final Office Action for U.S. Appl. No. 13/447,160 (dated Nov. 8, 2013).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
Dutta et al., "A Tight Lower Bound for Parity in Noisy Communcations Networks," Tata Institute of Fundamental Research, pp. 1056-1065 (2008).
Abbes et al., "Protocol Analysis in Intrusion Detection Using Decision Tree," IEEE, Proceedings of the International Conference on Information Technology: Coding and Computing (ITCC'04), pp. 1-5 (2004).
Nilsson et al., "The Scalable Tree Protocol—A Cache Coherence Approach for Large-Scale Multiprocessors," IEEE, pp. 498-506 (1992).
Sleator et al., "Self-Adjusting Binary Search Trees," Journal of the Association for Computing Machinery. Vol. 32, No. 3, pp. 652-686 (Jul. 1985).
Notice of Allowance and Fee(s) Due for U.S. Appl. No. 13/712,499 (dated Jun. 22, 2015).
Notice of Allowance and Fee(s) Due for U.S. Appl. No. 13/567,747 (dated Jun. 22, 2015).
Notice of Allowance and Fee(s) Due for U.S. Appl. No. 13/871,909 (dated Apr. 20, 2015).
Notice of Allowance and Fee(s) Due for U.S. Appl. No. 13/712,499 (dated Mar. 11, 2015).
Notice of Allowance and Fee(s) Due for U.S. Appl. No. 13/567,747 (dated Mar. 5, 2015).
Non-Final Office Action for U.S. Appl. No. 13/871,909 (dated Nov. 20, 2014).
Non-Final Office Action for U.S. Appl. No. 13/567,747 (dated Nov. 19, 2014).
Non-Final Office Action for U.S. Appl. No. 13/712,499 (dated Jul. 14, 2014).
"Ixload Specifications," http://web.archive.org/web/20130127053319//www.ixiacom.com/products/network_test/applications/ixload/specifications/index.php. pp. 1-7, (Jan. 27, 2013).
"A TCP Tutorial," ssfnet.org/Exchange/tcp/tcpTutorialNotes.html, pp. 1-10 (Apr. 4, 2012).
"IxLoad," Solution Brief, 915-3030-01. D, Ixia, pp. 1-4 (Feb. 2012).

Notice of Allowance and Fee(s) Due for U.S. Appl. No. 11/462,351 (dated Feb. 6, 2009).
Restriction Requirement for U.S. Appl. No. 11/462,351 (dated Jan. 2, 2009).
Ye et al., "Large-Scale Network Parameter Configuration Using an On-line Simulation Framework," Technical report, ECSE Department, Rensselear Polytechnic Institute (2002).
Business Wire, "Ixia's Web Stressing and In-Service Monitoring Products Names Best of Show Finalist at NetWorld+Interop 2001, Atlanta," 2 pages (Sep. 10, 2001).
PRNewsWire, "Caw Network Doubles Performance of Real-World Capacity Assessment Appliance Suite: WebAvalanche and WebReflector Now Generate and Respond to 20,000+ HTTP requests per Second With Over One Million Open Connections," 2 pages (Sep. 10, 2001).
Caw Networks, Inc. and Foundry Networks, Inc., "Caw Networks Performance Brief: Caw Networks and Foundry Networks 140,000 Transactions per Second Assessment," 1 page (Sep. 7, 2001).
MacVittie, "Online Only: CAW's WebReflector Makes Load-Testing a Cakewalk," Network Computing, 2 pages (Sep. 3, 2001).
Business Wire, "REMINDER/Caw Networks to Spotlight WebAvalanche 2.0 and WebReflector At Networld+Interop," 2 pages (May 8, 2001).
"Caw Networks Unveils New Web-Stressing Appliance," press release from Caw Networks, Inc., 2 pages (Mar. 5, 2001).
Ye et al., "Network Management and Control Using collaborative On-Line Simulation," Proc. IEEE International Conference on Communications ICC2001, Helsinki, Finland, pp. 1-8 (2001).
Business Wire, "NetIQ's Chariot 4.0 Goes Internet-Scale; ASPs and Service Providers Can Conduct Tests With Up to 10,000 Connections; New Visual Test Designer Simplifies Testing of All Sizes," 1 page (Oct. 23, 2000).
Business Wire, "Spirient Communications TeraMetrics and NetIQ's Chariot Work Together to Create First Complete Network Performance Analysis Solution," 2 pages (Sep. 25, 2000).
Kovac, "Validate your equipment performance—Netcom Systems' SmartBits—Hardware Review—Evaluation," Communications News, 2 pages (May 2000).
Marchette, "A Statistical Method for Profiling Network Traffic," USENIX (Apr. 12-19, 1999).
Cooper et al., "Session traces: an enhancement to network simulator," Performance, computing and Communications Conference, Scottsdale, AZ (Feb. 1, 1999).
San-qi, et al., "SMAQ: A Measurement-Based Tool for Traffic Modeling and Queuing Analysis Part I; Design methodologies and software architecture," IEEE Communications Magazine, pp. 56-65 (Aug. 1, 1998).
San-qi, et al., "SMAQ: A Measurement-Based Tool for Traffic Modeling and Queuing Analysis Part II; Network Applications," IEEE Communications Magazine, pp. 66-77 (Aug. 1, 1998).
Mneimneh, "Computer Networks Flow control with TCP," pp. 1-5 (Publication Date Unknown).
Pinheiro et al., "FSM-Based Test Case Generation Methods Applied to Test the Communication Software on Board the ITASAT University Satellite: A Case Study," Journal of Aerospace Technology and Management, vol. 6 No. 4, pp. 447-461 (Oct. 2014).
"Using Finite State Machine at the Testing of Network Protocols," ResearchGate, pp. 1-6 (Oct. 2011).
Yang et al., "An Automated Mechanism of Security Test on Network Protocols," 2009 Fifth International Conference on Information Assurance and Securtiy,IEEE Computer Society, pp. 503-506 (2009).
Gineste et al., "Programmable Active Emulation of Wireless Systems—A DVB-RCS Example," WIOPT, pp. 1-6 (Apr. 2008).

* cited by examiner

METHODS, SYSTEMS, AND COMPUTER READABLE MEDIA FOR IMPLEMENTING A GENERALIZED MODEL FOR DEFINING APPLICATION STATE MACHINES

PRIORITY CLAIM

This application claims the priority benefit of Romanian Patent Application Serial No. a 2019 00814, filed Nov. 28, 2019, the disclosure of which is incorporated herein by reference in its entirety.

TECHNICAL FIELD

The subject matter described herein relates to network equipment testing. More particularly, the subject matter described herein relates to methods, systems, and computer readable media for implementing a generalized model for defining application state machines.

BACKGROUND

While state machines have been utilized for the purpose conducting network traffic testing at a device under test, the use of these state machines has generally been confined to specific communication protocols that are directly incorporated into the application state machines. More specifically, the entirety of a specific communication protocol to be used for testing is typically embedded into a test engine in an attempt to minimize the consumption of resources. However, a test system that is tasked to simulate diverse network behaviors corresponding to a large number of emulated users is notably restricted when such testing is limited to the communications protocols integrated into the test engine. Namely, accurate testing necessitates a test system that can produce realistic and complex mixes of network traffic that is not constrained to a specific protocol. Other challenges associated with test systems restricted in this manner include extensive resource requirement costs as well as the significant time requirements that are associated with the provisioning and supporting of new testing scenarios.

Accordingly, there exists a need for methods, systems, and computer readable media for implementing a generalized model for defining application state machines.

SUMMARY

According to one aspect, the subject matter described herein includes a method for implementing a generalized model for defining application state machines that includes utilizing a user behavioral state machine construct layer of a generalized application emulation model (GAEM) system to emulate a plurality of high level user behaviors originating from a plurality of emulated network users and utilizing a business application logic state machine construct layer in the GAEM system to emulate access rules and policies of an application to be defined. The method further includes utilizing a message parsing state machine construct layer in the GAEM system to emulate input/output (IO) events and network messaging events originating from emulated network entities and utilizing at least one network traffic processing agent in the GAEM system that is configured to establish an execution environment for facilitating the interactions among the user behavioral state machine construct layer, business application logic state machine construct layer, and the message parsing state machine construct layer such that when executed in the execution environment, the interactions establish a definition for a state machine that is representative of the application.

In one example of the method, the high level user behaviors are represented as parallel tracks, wherein each of the parallel tracks is a sequence of operations that is exposed by one or more applications.

In one example of the method, two or more of the parallel tracks are synchronized together at synchronization points.

In one example of the method, an output of one or more of the construct layers is provided to the at least one network traffic processing agent for execution.

In one example of the method, emulated network packet traffic is generated by the at least one network traffic processing agent.

In one example of the method, the user behavioral state machine construct layer, the business application logic state machine construct layer, and the message parsing state machine construct layer are configured to communicate data via filing of events.

In one example of the method, service access rules associated with the business application logic state machine construct layer are defined by an operator of a network under test.

According to one aspect, the subject matter described herein includes a system for implementing a generalized model for defining application state machines that comprises a user behavioral state machine construct layer configured to emulate a plurality of high level user behaviors originating from a plurality of emulated network users and a business application logic state machine construct layer configured to emulate access rules and policies of an application to be defined. The system further includes a message parsing state machine construct layer configured to emulate input/output (IO) events and network messaging events originating from emulated network entities and at least one network traffic processing agent that is configured to establish an execution environment for facilitating the interactions among the user behavioral state machine construct layer, the business application logic state machine construct layer, and the message parsing state machine construct layer such that when executed in the execution environment, the interactions establish a definition for a state machine that is representative of the application.

In one example of the system, the high level user behaviors are represented as parallel tracks, wherein each of the parallel tracks is a sequence of operations that is exposed by one or more applications.

In one example of the system, two or more of the parallel tracks are synchronized together at synchronization points.

In one example of the system, an output of one or more of the construct layers is provided to the at least one network traffic processing agent for execution.

In one example of the system, emulated network packet traffic is generated by the at least one network traffic processing agent.

In one example of the system, the user behavioral state machine construct layer, the business application logic state machine construct layer, and the message parsing state machine construct layer are configured to communicate data via filing of events.

In one example of the system, service access rules associated with the business application logic state machine construct layer are defined by an operator of a network under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for generalized model for defining application state machines are provided. In some embodiments, the subject matter described herein relates to a network test system that generates highly realistic network user traffic associated with various protocols at large scale (e.g., a large number of simultaneous user emulations) for the purposes of testing a device under test (DUT) or system under test (SUT). In some embodiments, the disclosed subject matter may pertain to applications beyond network testing, such as network monitoring, network security, facilitating smart contracts, and the like.

Figure 1:
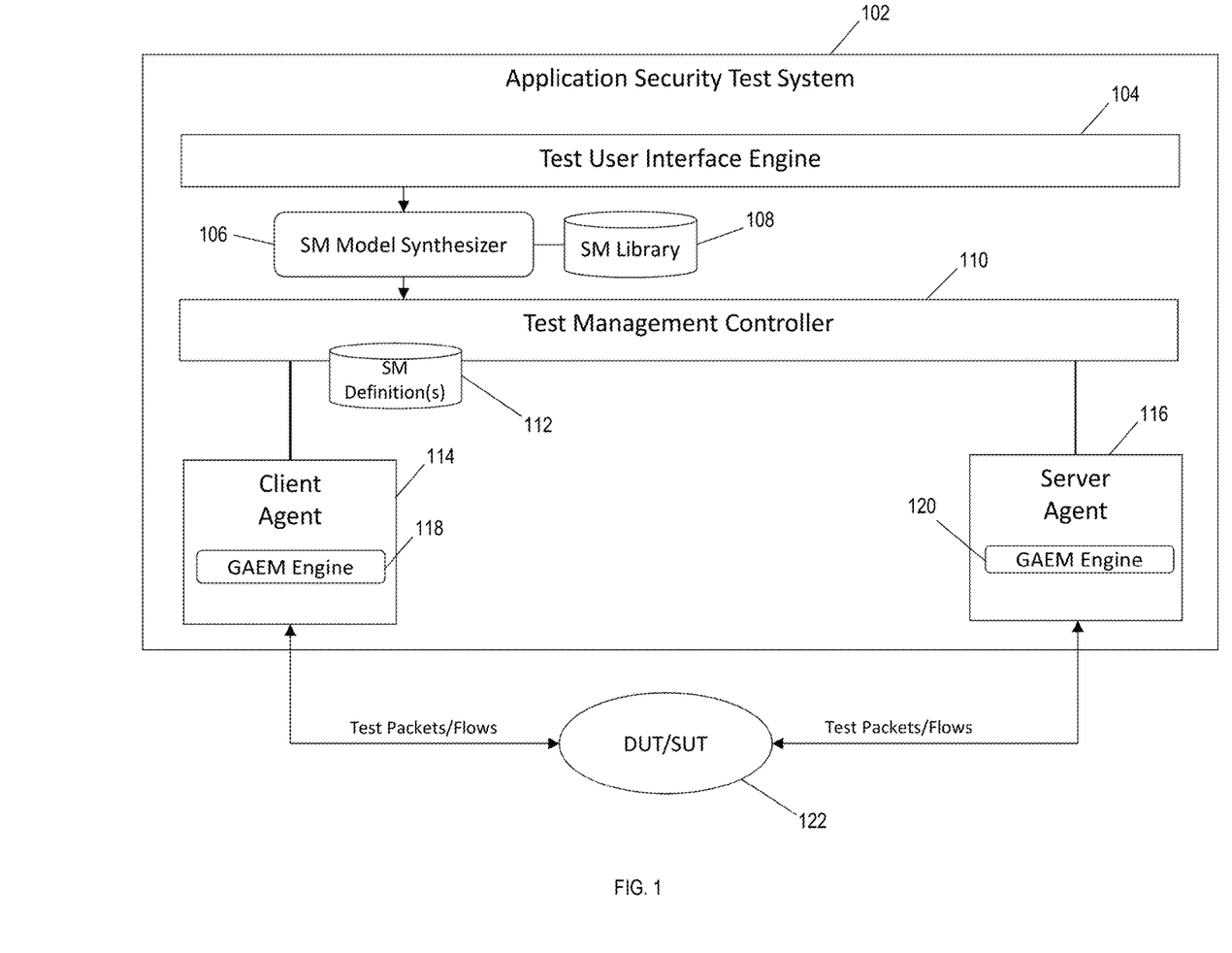
FIG. 1 is a block diagram illustrating an exemplary generalized model for defining application state machines according to an embodiment of the subject matter described herein.

In some embodiments, the disclosed subject matter may be implemented as an application security testing system 102. As shown in FIG. 1, application security testing system 102 includes a user interface (UI) configuration engine 104, a state machine (SM) model synthesizer 106, a state machine library 108, a test management controller 110, a client agent 114, and a server agent 116. Notably, a DUT 122 (or SUT) can be communicatively connected (e.g., a wired connection or wireless connection) to system 102 via the client agent 114 and the server agent 116.

As shown in FIG. 1, application security testing system 102 includes a UI configuration engine 104 that is configured to enable a test operator to specify a test case that can be used to test DUT 122. For example, UI configuration engine 104 can be configured to define a test case that includes various emulated user network behaviors and an application business logic associated with an application being used by DUT 122. Application security testing system 102 further includes a generalized SM model synthesizer 106 that is adapted to synthesize and/or generate a state machine traffic model that includes a plurality of state machine definitions and is based on the aforementioned specified user network behaviors and application business logic.

In some embodiments, SM model synthesizer 106 can be configured to synthesize the state machine definitions of the state machine traffic model using a high-level programming language (e.g., Python). Further, the state machine definitions can be synthesized using a high-level programming such that the state machine models can be segmented into state machine fragments. These state machine fragments can be programmed or logically interconnected by SM model synthesizer 106 to provide a desired testing functionality. Further, the state machine fragments can be stored by SM model synthesizer 106 in a local SM library 108 for subsequent access and use. More specifically, state machine definitions can be synthesized by synthesizer 106 using a reusable and extensible library of state machine fragments (SMFs) maintained in SM library 108. Further, the SMFs may be written in Python or other suitable programming language. Different test operator objectives and/or goals may require the synthesis of various SM-based traffic definitions, which are constructed and dynamically implemented into a generalized application emulation model (GAEM) engine (e.g., GAEM engine 118 or 120).

In some embodiments, a GAEM engine is responsible for establishing and defining a plurality of state machines corresponding to the state machine definitions received from controller 110. Notably, a GAEM engine can be a generic and/or protocol agnostic engine that can be implemented in software and run on a wide variety of test system-related hardware nodes. For example, the hosting hardware node can include an adjunct server, an appliance device, an internal processor, or the like. Other nodes can comprise an hardware component with an installed operating system. Alternatively, a node as used herein can be a virtual machine, cloud computing instance, or the like. In some embodiments, the GAEM engine is implemented in software that can be incorporated into and/or executed by an agent, such as client agent 114 or server agent 116 as shown in FIG. 1. Namely, the software implementation is not dependent on any test system hardware of any particular vendor. Software embodiments of GAEM engine 112 may run in many environments including, but not limited to, new network monitoring appliances, old network monitoring modules, off-the-shelf servers, virtual machines, cloud instances, and/or the like. Alternatively, the GAEM engine may be implemented as a dedicated hardware component.

Notably, the state machine definitions of a state machine traffic model may be provided by SM model synthesizer 106 to test management controller 110 for distribution to GAEM engines 118 and 120. In some embodiments, test management controller 110 is primarily responsible for managing all of the agents (and their respective host nodes) in system 102. For example, test management controller 110 can be configured to distribute the different state machine definitions (e.g., application definitions) and associated user inputs to the different agents (e.g., agents 114 and 116). Test management controller 110 can also be configured to assign different application profiles or roles to each of the agents based on the state machine definitions and associated user inputs (that the controller distributes among all the agents).

As indicated above, the application state machine definitions (along with user input data) can be delivered and provisioned in a GAEM engine, which provides a state machine execution environment. Notably, there is a GAEM engine residing in each agent of application security test system 102, e.g., client agent 114 and server agent 116. Once the state machine definitions are provisioned in the agents, each GAEM engine can use the definitions to execute the application state machines, which are configured to perform one or more test emulation functions, such as generating test network traffic. Specifically, the client and server agents are configured to generate network traffic test packets and packet flows in accordance with the definitions of the executed SM model. As shown in FIG. 1, client agent 114 and server agent 116 can bidirectionally communicate test packets and/or flows via DUT 122. In some embodiments, the application state machine definitions provisioned on the agents define the agents as specific actors (e.g., a server actor or a client actor). Specifically, after receiving the application profile from test management controller 110, the GAEM engine will begin emulating an element that complies with the defined application role (e.g., generate the test traffic profile of interest). For example, the client agent 114 may be defined by a provisioned state machine definition as a client actor (e.g., a client machine requesting a service or data from a server) while server agent 116 may be defined by a provisioned state machine definition as a server actor (e.g., an image storage server, a video server, a database server, a web server, and the like that is configured for receiving client requests).

In some embodiments, the GAEM engine is configured to use the synthesized SM definitions (e.g., application state machine definitions) to define and generate a respective application state machine that is executed within an agent. For example, each state machine can be defined by a set of states ($\mathcal{S}$), a set of events ($\mathcal{E}$), a set of actions ($\mathcal{A}$), an initial state ($\mathcal{I}$), and a map. For example, an exemplary state machine can be defined as follows:

$$\mathcal{F}: \mathcal{S} \times \mathcal{E} \rightarrow \mathcal{A} \times \mathcal{S} \text{ i.e.,}$$

$$\mathcal{F}(Current\ State,\ Event) = (Action,\ Next\ State)$$

Notably, each action is defined as a sequence of well-known instructions. Each application state machine definition also includes a set of exposed operations ($\mathcal{O}$). In some embodiments, the operation includes a plurality of elements, where each element is a tuple comprising i) an initiating event, ii) a set of states indicating successful termination, and iii) a set of statistics indicating failed termination.

According to another aspect of the subject matter described herein, one application definition can inherit a definition from another application state machine definition. Since each application state machine definition is composed of transition tables and/or maps (represented by $\mathcal{F}$ in the examples above), emulated applications can be extended by referring to base transition tables and defining differences existing in the base transition tables in terms of i) adding new transitions to the base tables, ii) deleting transitions from the base tables, and/or iii) modifying transitions in the base tables. Notably, the application definition may define a plurality of actors (e.g., one or more server actors and client actors) that are involved with the execution of an application.

In some embodiments, client agent 114 and server agent 116 may each include traffic generation hardware modules (e.g., transmission hardware engines) that are implemented, at least in part, in programmable logic devices such as field programmable gate arrays (FPGAs) and/or multi-core central processing units (CPUs). These traffic generation hardware modules further include networking device ports that can be used to establish a connection with the device under test 122. As shown in FIG. 1, agents 114-116 are configured to communicate test packets or flows in a bidirectional manner via DUT 122. In some alternate embodiments, client agent 114 and server agent 116 can comprise software constructs that include software-based ports. As indicated above, client agent 114 and server agent 116 are designed to provide SM execution environments that are capable of loading and executing one or more application state machines. Notably, execution of the state machine drives the lower-layer transmission and receiving agents to communicate test packets and associated packet flows that are associated with emulated network users in a particular test case scenario. More specifically, agents 114-116 are designed to receive instructions provided by the output of the application state machines (of the GAEM engine), which provides instructions that define and control the generation of test packets and packet flows associated with highly realistic emulations of network end users.

Although not depicted in FIG. 1, test system 102 may include at least one processor and memory. In some embodiments, the processor includes a microprocessor, such as a central processing unit (CPU), or any other hardware-based processor unit that is configured to execute and/or utilize software and/or algorithms associated with test system 102 (e.g., GAEM engines 118-120, test management controller 110, agents 114-116, and the like) and any platforms associated therewith. Further, memory included in test system 102 (e.g., a memory element or device) may include a random access memory (RAM), a read only memory (ROM), an optical read/write memory, a cache memory, a magnetic read/write memory, a flash memory, or any other non-transitory storage media. In some embodiment, the processor and memory may be used to execute and manage the operation of test system 102 and/or the GAEM engines.

Figure 2:
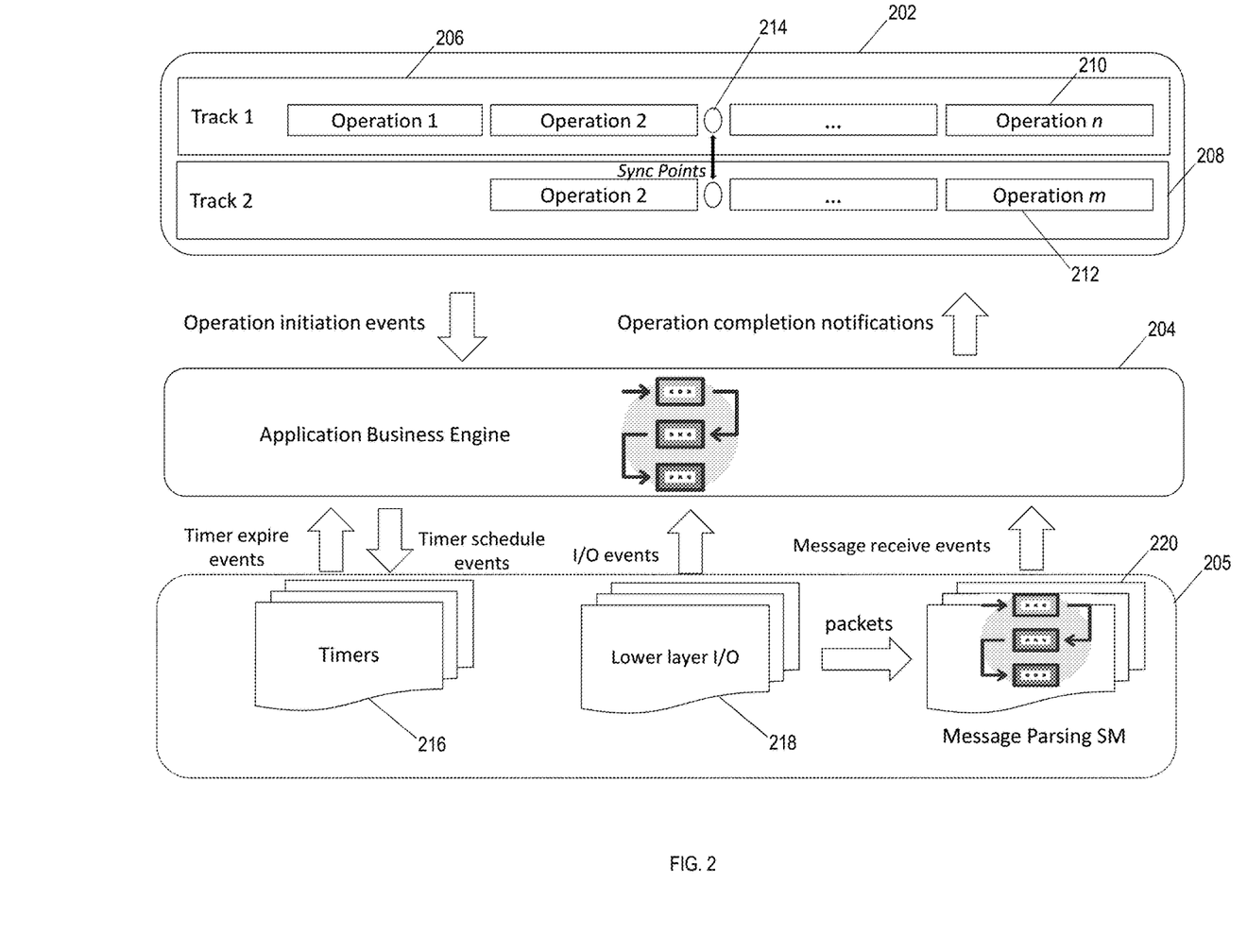
FIG. 2 is a block diagram illustrating the exemplary layers of an generalized application emulation model (GAEM) engine according to an embodiment of the subject matter described herein.

FIG. 2 is a block diagram illustrating the exemplary construct layers of a GAEM engine that includes a number of generated application state machine according to an embodiment of the subject matter described herein. In one implementation, a GAEM engine provisioned on an agent used by test system 102 (shown in FIG. 1) can be organized into three functional layers: i) Layer 1—Behavioral, ii) Layer 2—Business Logic, and iii) Layer 3—On-The-Wire. As shown in FIG. 2, the first layer is represented by a user behavior state machine construct layer 202 that is intended to model the high-level behaviors of one or more emulated network users. For example, these behaviors can be modeled as the particular applications and services that are being used and/or accessed by emulated network users along with their respective timing and frequency of use. More specifically, user behavior state machine construct layer 202 may comprise a state machine that is configured to simulate a number of scenarios representative of emulated user actions. In some embodiments, the emulated user behaviors (or scenarios) generated by construct layer 202 can be represented as parallel tracks 206-208. Notably, each of the parallel tracks 206-208 can be a sequence of operations exposed by one or more applications. Further, each of these operations can be adapted to invoke and/or trigger one or more of the application state machines. In addition, construct layer 202 can be configured to synchronize parallel tracks 206-208 with each other at different synchronization points 214. Notably, synchronization points can be utilized by the constructs layer to ensure that certain operations emulating the different user behaviors are conducted at particular points in time and/or contemporaneously with each other. In some embodiments, the tracks can represent user behaviors such as listening to Internet radio, accessing data from different web browser tabs, conducting a banking transaction, sending an email, and/or the like.

Similarly, the second layer is represented in FIG. 2 as a business logic state machine construct layer 204 that is configured to model and emulate application and service access rules and policies that are defined by the operator of the DUT or SUT. These defined rules and policies may be provided to test system 102 via the test user interface engine 104 as depicted in FIG. 1. In some embodiments, application business logic state machine construct layer 204 comprises a finite state machine that can be defined by application developers, such as system engineers or client operators. Notably, application business logic state machine construct layer 204 interacts or communicates with user behavior state machine construct layer 202 via the filing of events. For example, construct layer 202 can be configured to issue operation initiation events to file or issue operation initiation events to application business logic state machine construct layer 204. In response, construct layer 204 can be configured to issue operation completion notifications to user behavior state machine construct layer 202 as a filed event(s).

Lastly, the on-the-wire SM construct layer is represented as a message parsing state machine construct layer 205 that is configured to model and emulate the messaging and associated messaging protocols used by an emulated network user. As shown in FIG. 2, message parsing state machine construct layer 205 comprises a finite state machine that is adapted to provide external network events. For example, message parsing state machine construct layer 205 is configured to issue timer expiration events to business logic state machine construct layer 204. Likewise, message parsing state machine construct layer 205 is configured to receive timer schedule events that are filed by business logic state machine construct layer 204. For example, a timer can be started and subsequently generated event after an expiration period. One example includes the application state machine being in a state where it sends a request and then initiate the timer. As such, a second event may occur depending on whether or not a response message is received in response to the request prior to the expiration of the timer.

Another source of events can be attributed to the input/output activity occurring in the lower layer of the application (e.g., lower layer I/O 218). In particular, input/output (I/O) events can be filed from message parsing state machine construct layer 205 to application business construct layer 204 as shown in FIG. 2. For example, a common source of evens are I/O packets that are received on-the-wire from the network and are indicative of events, such as the establishing of a connection or the disconnecting of a connection. The I/O packets may also comprise any type of message and/or protocol type. Examples of I/O packets include, but are not limited to, hypertext transfer protocol (HTTP) requests, HTTP responses, simple mail transfer protocol (SMTP) messages, Internet message access protocol (IMAP) messages and the like.

Furthermore, lower layer I/O 218 can also be configured to send packets to a message parsing logic state machine 220 hosted by message parsing state machine construct layer 205. In some embodiments, the packets received by message parsing logic state machine 220 are received over the wire via a network interface port. Notably, message parsing logic state machine 220 is configured to receive the packets and forward them to application business construct layer 204 for processing. In some embodiments, application business construct layer 204 is configured to determine the initial state of the application state machine, inspect the bytes or signature contained in the received packets. Depending on the protocol or data indicated by the inspected bytes/signature in the packets, application business construct layer 204 is configured to utilize the determined data and the determined initial state to access a state transition table. Notably, the state transition table will indicate if the particular event associated with the initial state and the determined data has triggered a transition in the state machine. For example, message parsing state machine construct layer 205 can utilize this process to discern between whether certain expected attachments were received or alternatively, an error occurred.

Figure 3:
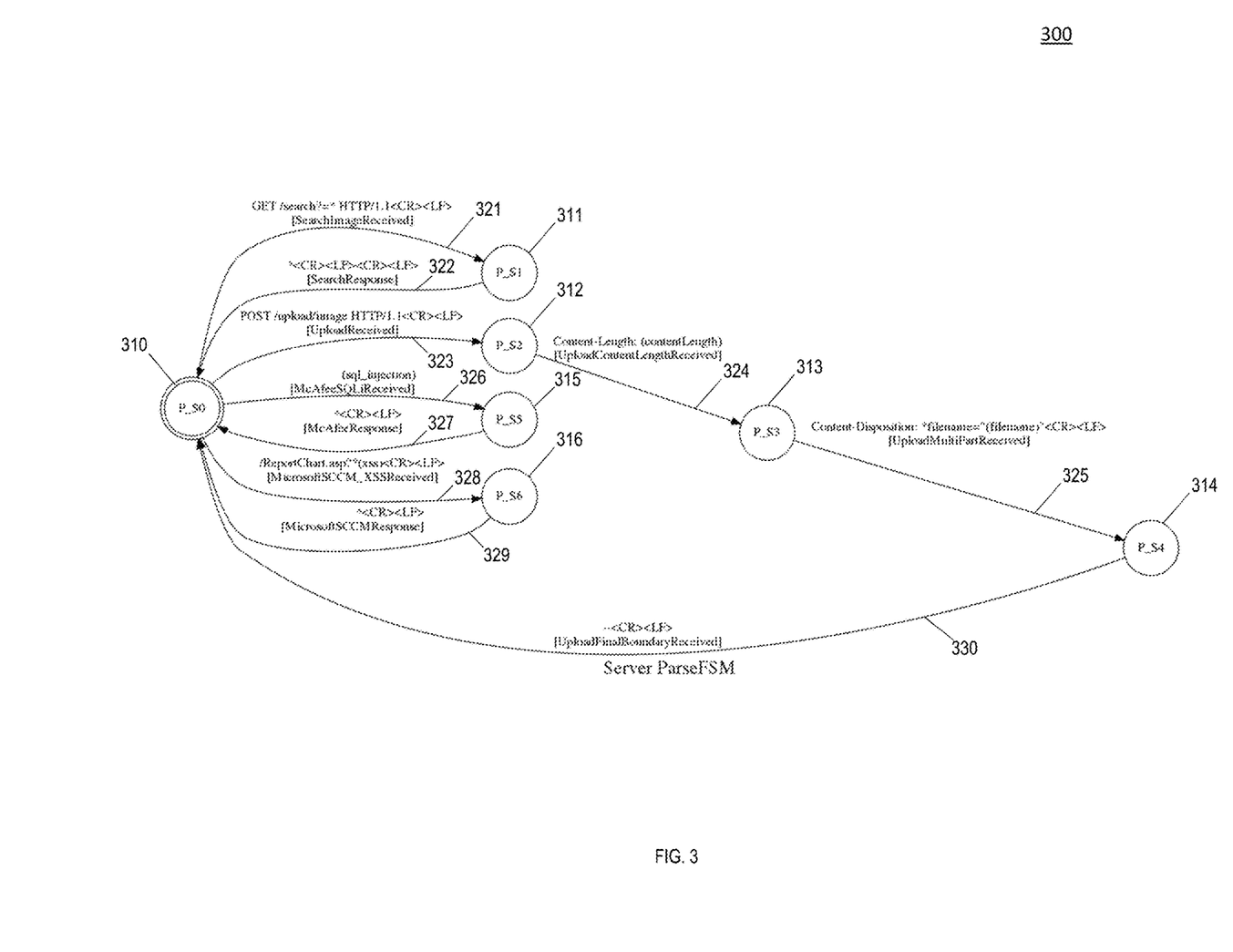
FIG. 3 illustrates a logical representation of an exemplary finite state machine configured to provide a search functionality for a server actor according to an embodiment of the subject matter described herein.

FIG. 3 illustrates an exemplary finite state machine 300 that is configured to function as an application's message parsing logic provisioned on a server agent (e.g., server agent 116 shown in FIG. 1) that is functioning as a 'server actor'. In this exemplary embodiment, the application features a search functionality for images that are stored on the server agent (or server actor). As shown in FIG. 3, finite state machine 300 includes a plurality of parsing logic states 310-316 that may be traversed in response to transitions 321-330. For example, state machine 300 may start at the initial state "P_S0" and transition based on the occurrence of an event. For example, the server agent portion (e.g., acting as an image file storage server) of the application may be configured to trigger an event in response to receiving a search request from a client actor. Notably, the state machine may reference a state transition table that indicates that state machine 300 proceeds to state 311 in response to an HTTP GET search request message (see transition 321). In particular, a transition from state 310 to state 311 transpires and the state machine 300 is in "searching image received" state that is represented as P_S1. The state machine 300 can then utilize this state information to access a state transition table to determine that a "search response message" (e.g., see transition 322) should be sent. As shown in FIG. 3, the sending of the search response message triggers a transition back to P_S0 state 310. FIG. 3 depicts other states and transitions that can be executed and or exposed based on the protocol (e.g., HTTP, SQL, Microsoft SCCM, McAfee, etc.) of the message received by the server agent portion of the application.

Figure 4:
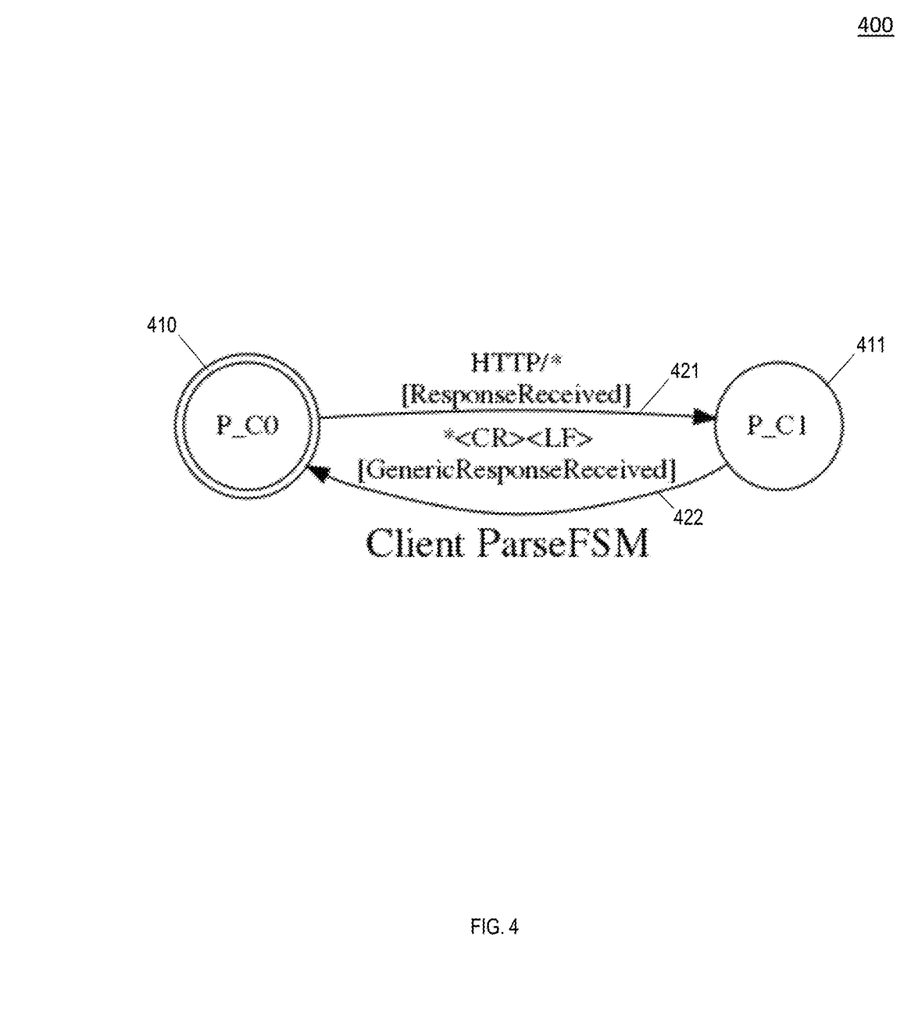
FIG. 4 illustrates a logical representation of an exemplary finite state machine configured to provide a search functionality for a client actor according to an embodiment of the subject matter described herein.

FIG. 4 illustrates an example finite state machine 400 that is configured to function as an application's message parsing logic provisioned on a client actor (e.g., transmission agent 114 shown in FIG. 1). In this exemplary embodiment, the application features a client actor that is communicating with an image server agent/actor with respect to the image search requests described above and depicted in FIG. 3. As shown in FIG. 4, finite state machine 400 includes two parsing logic states 410-411 that may be traversed in response to transitions 321-330. For example, the state machine 400 may start at the initial state "P_C0" and experience a transition 421 based on the occurrence of an event. For example, the client agent portion (e.g., acting as the requesting entity for an image file stored on the server actor) of the application may be configured to trigger an event in response to receiving a response from the server actor. For example, the client agent portion of the application may be configured to trigger an event in response to receiving a search result response from the server actor. Notably, the state machine 400 may reference a state transition table that indicates that state machine 400 is to transition to state 411 ("P_C1") in response to receiving an HTTP response message. State machine 400 can then utilize this state information to access the state transition table to determine that a "Generic Response Message" (e.g., see transition 422) should be sent. As shown in FIG. 4, the sending of the response message triggers a transition back to P_C0 state 410.

Figure 5:
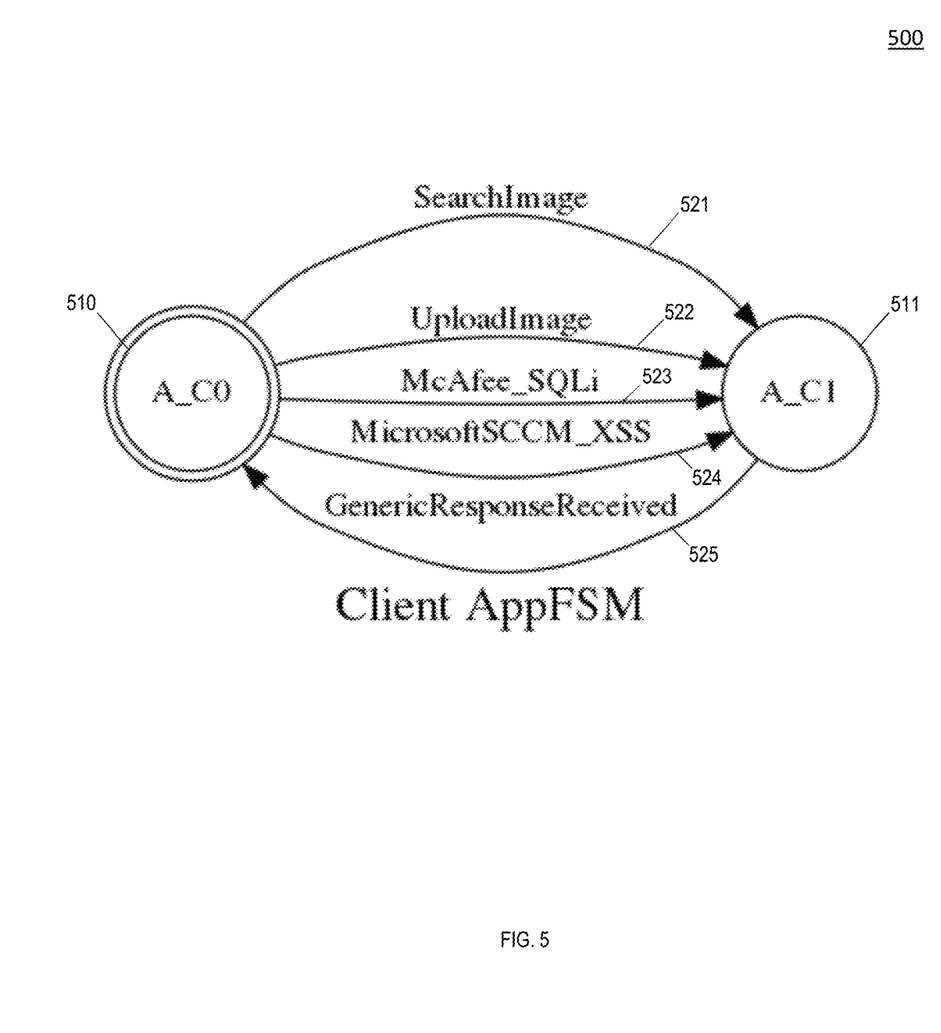
FIG. 5 illustrates a logical representation of an exemplary finite state machine configured to provide an upload functionality for a client actor according to an embodiment of the subject matter described herein.

FIG. 5 illustrates an example finite state machine 500 that is configured to function as an application's business logic that provisioned on a client actor (e.g., client agent 114 shown in FIG. 1). In this exemplary embodiment, the application features a client actor that is attempting to store an image on the server actor. As shown in FIG. 5, finite state machine 500 includes two application business logic states 510-511 that may be transitioned in response to transition events 521-525. For example, state machine 500 may start at initial state "P_A0" (e.g., state 510) and can be configured to proceed to state A_C1 (e.g., state 511) by way of transitions 521-524. For example, state machine 500 can refer to a state transition table in response to an event transpiring. Events such as searching for an image, uploading an image, or receiving a system vulnerability alert, such as a message from a McAfee application or a Microsoft System Center Configuration Manager (SCCM) application. Notably, any of these events trigger a transition to state 511. At this state, state machine 500 is configured to inspect the packets associated with the message and reference a state transition table using the originating state 510 and the packet data to determine if state machine 500 transitions to state 510. For example, a response can be sent to the event originator, thereby triggering a return transition to A_C0 (e.g., state 510), which represents that a generic response was received by the client actor.

Figure 6:
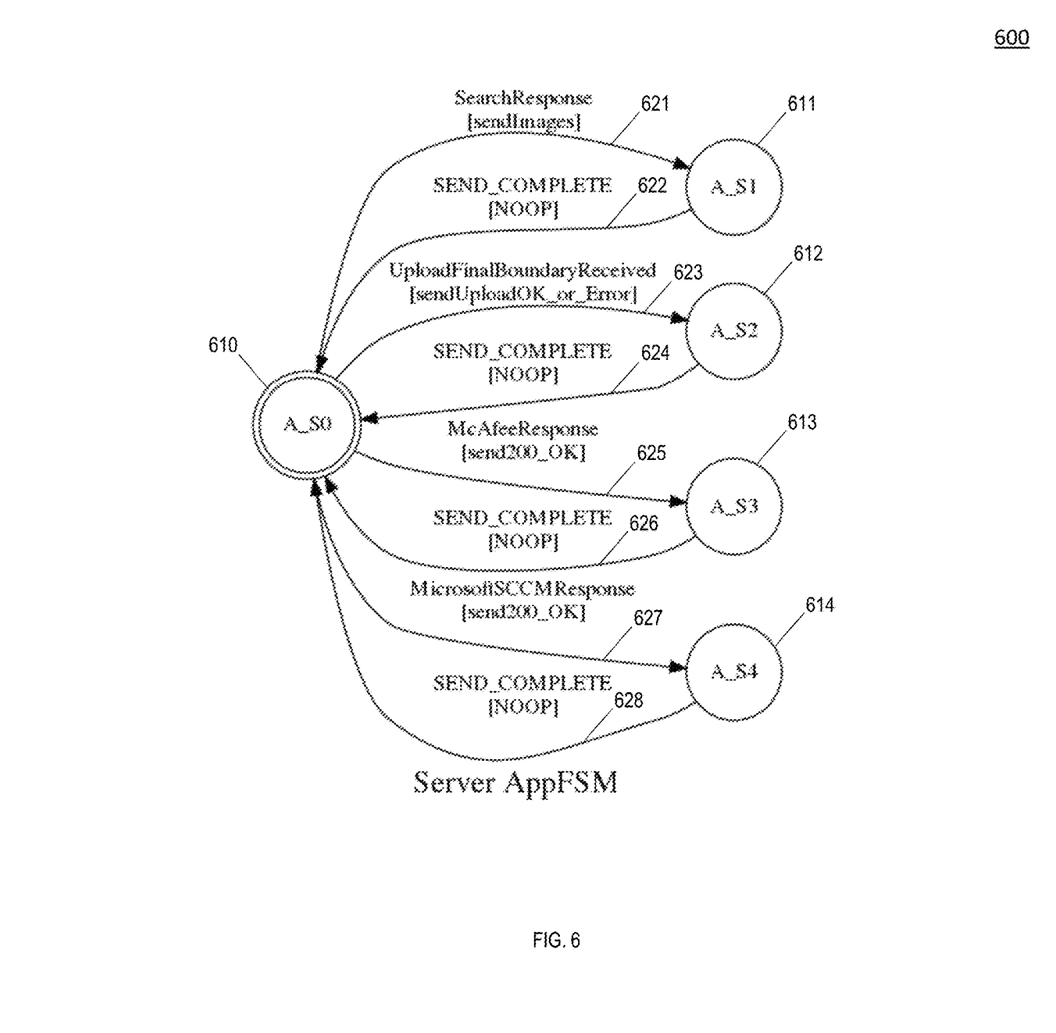
FIG. 6 illustrates a logical representation of an exemplary finite state machine configured to provide an upload functionality for a server actor according to an embodiment of the subject matter described herein.

FIG. 6 illustrates an example finite state machine 600 that is configured to function as an application's business logic provisioned on a server agent 116 as shown in FIG. 1. In this exemplary embodiment, the application features an upload functionality that allows a client agent to store an image on the server agent (or server actor). As shown in FIG. 6, finite state machine 600 includes a plurality of business logic states 610-614 that may be transitioned in response to transitions 621-628. For example, state machine 600 may start at the initial state "S_S0" and experience any number of transitions based on the occurrence of an associated event. For example, the server agent portion of the application may be configured to trigger a transition in response to receiving an upload request from a client actor. Notably, the state machine may reference a state transition table that indicates that state machine 600 proceeds to state 611 in response to a search response message 621. In particular, a transition from state 610 to state 611 transpires and the state machine 600 is in "send images" state that is represented as A_S1. The state machine 600 can then utilize this state information to access a state transition table to determine that a "send complete message" (e.g., see transition 622) should be sent. As shown in FIG. 6, the sending of the send complete message triggers a transition back to A_S0 state 610. FIG. 6 depicts other states and transitions that can be executed and or exposed based on the protocol (e.g., HTTP, SQL, Microsoft SCCM, McAfee, etc.) of the message received by the server agent portion of the application.

Figure 7:
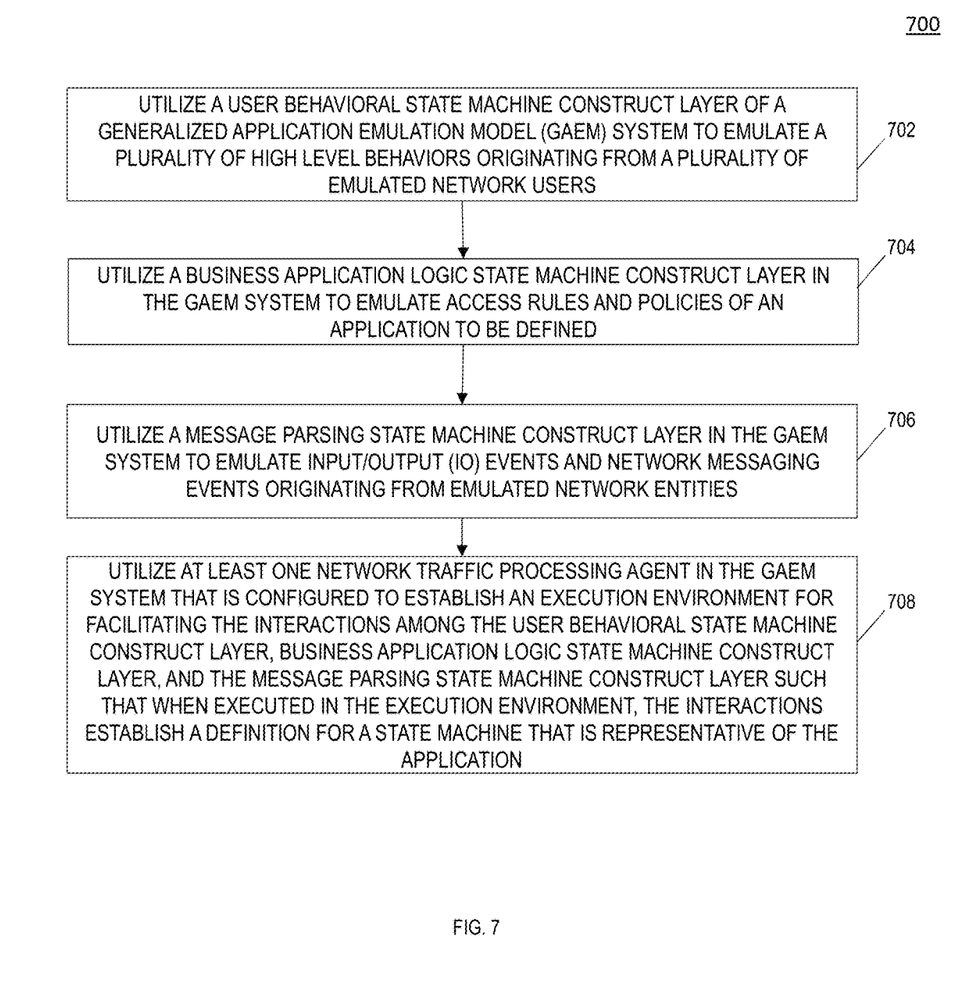
FIG. 7 is a flow chart for utilizing a generalized model for defining application state machines according to an embodiment of the subject matter described herein.

FIG. 7 is a flow chart illustrating an exemplary method 700 for implementing a generalized model for defining application state machines according to an embodiment of the subject matter described herein. In some embodiments, blocks 702-708 of method 700 may represent an algorithm that is stored in memory and executed by one or more processors of application security test system 102.

In block 702, method 700 includes utilizing a user behavioral state machine construct layer of a generalized application emulation model (GAEM) system to emulate a plurality of high level user behaviors originating from a plurality of emulated network users. In some embodiments, the high level user behaviors are represented as parallel tracks, wherein each of the parallel tracks is a sequence of operations that is exposed by one or more applications.

In block 704, method 700 includes utilizing a business application logic state machine construct layer in the GAEM system to emulate access rules (e.g., service access rules) and policies of an application to be defined.

In block 704, method 700 includes utilizing a message parsing state machine construct layer in the GAEM system to emulate input/output (IO) events and network messaging events originating from emulated network entities.

In block 706, method 700 includes utilizing at least one network traffic processing agent in the GAEM system that is configured to establish an execution environment for facilitating the interactions among the user behavioral state machine construct layer, business application logic state machine construct layer, and the message parsing state machine construct layer such that when executed in the execution environment, the interactions establish a definition for a state machine that is representative of the application.

It should be noted that each of the GAEM engine and/or functionality described herein may constitute one or more special purpose computing devices constituting a practical application. Further, embodiments of the GAEM and/or functionality described herein can improve the technological field of network traffic testing environments by implementing a new test system that produces realistic and complex mixes of network traffic associated with a large number of users. For example, the use of a GAEM engine system enables a DUT/SUT test operator to describe network user behaviors at a high level as well as to specify application business logic rules that are to be applied in the DUT/SUT. As such, large scale testing scenarios (e.g., large number of simultaneous user emulations) may be conducted in a more efficient and realistic manner while also utilizing less computing resources than other network testing implementations.

It will be understood that various details of the subject matter described herein may be changed without departing from the scope of the subject matter described herein. Furthermore, the foregoing description is for the purpose of illustration only, and not for the purpose of limitation.

What is claimed is:
1. A method comprising:
utilizing a user behavioral state machine construct layer of
a generalized application emulation model (GAEM)

system to emulate a plurality of high level user behaviors originating from a plurality of emulated network users;

utilizing a business application logic state machine construct layer in the GAEM system to emulate access rules and policies of an application to be defined;

utilizing a message parsing state machine construct layer in the GAEM system to emulate input/output (I/O) events and network messaging events originating from emulated network entities; and utilizing at least one network traffic processing agent in the GAEM system that is configured to establish an execution environment for facilitating the interactions among the user behavioral state machine construct layer, business application logic state machine construct layer, and the message parsing state machine construct layer such that when executed in the execution environment, the interactions establish a definition for a state machine that is representative of the application.

2. The method of claim 1 wherein the high level user behaviors are represented as parallel tracks, wherein each of the parallel tracks is a sequence of operations that is exposed by one or more applications.

3. The method of claim 2 wherein two or more of the parallel tracks are synchronized together at synchronization points.

4. The method of claim 1 wherein an output of one or more of the construct layers is provided to the at least one network traffic processing agent for execution.

5. The method of claim 4 wherein emulated network packet traffic is generated by the at least one network traffic processing agent.

6. The method of claim 1 wherein the user behavioral state machine construct layer, the business application logic state machine construct layer, and the message parsing state machine construct layer are configured to communicate data via filing of events.

7. The method of claim 1 wherein service access rules associated with the business application logic state machine construct layer are defined by an operator of a network under test.

8. A generalized application emulation model (GAEM) system comprising:

a user behavioral state machine construct layer configured to emulate a plurality of high level user behaviors originating from a plurality of emulated network users;

a business application logic state machine construct layer configured to emulate access rules and policies of an application to be defined;

a message parsing state machine construct layer configured to emulate input/output (I/O) events and network messaging events originating from emulated network entities; and at least one network traffic processing agent that is configured to establish an execution environment for facilitating the interactions among the user behavioral state machine construct layer, the business application logic state machine construct layer, and the message parsing state machine construct layer such that when executed in the execution environment, the interactions establish a definition for a state machine that is representative of the application.

9. The system of claim 8 wherein the high level user behaviors are represented as parallel tracks, wherein each of the parallel tracks is a sequence of operations that is exposed by one or more applications.

10. The system of claim 9 wherein two or more of the parallel tracks are synchronized together at synchronization points.

11. The system of claim 8 wherein an output of one or more of the construct layers is provided to the at least one network traffic processing agent for execution.

12. The system of claim 11 wherein emulated network packet traffic is generated by the at least one network traffic processing agent.

13. The system of claim 8 wherein the user behavioral state machine construct layer, the business application logic state machine construct layer, and the message parsing state machine construct layer are configured to communicate data via filing of events.

14. The system of claim 8 wherein service access rules associated with the business application logic state machine construct layer are defined by an operator of a network under test.

15. A non-transitory computer readable medium having stored thereon computer executable instructions that when executed by a processor of a computer controls the computer to perform steps comprising:

utilizing a user behavioral state machine construct layer of a generalized application emulation model (GAEM) system to emulate a plurality of high level user behaviors originating from a plurality of emulated network users;

utilizing a business application logic state machine construct layer in the GAEM system to emulate access rules and policies of an application to be defined;

utilizing a message parsing state machine construct layer in the GAEM system to emulate input/output (I/O) events and network messaging events originating from emulated network entities; and utilizing at least one network traffic processing agent in the GAEM system that is configured to establish an execution environment for facilitating the interactions among the user behavioral state machine construct layer, business application logic state machine construct layer, and the message parsing state machine construct layer such that when executed in the execution environment, the interactions establish a definition for a state machine that is representative of the application.

16. The non-transitory computer readable medium of claim 15 wherein the high level user behaviors are represented as parallel tracks, wherein each of the parallel tracks is a sequence of operations that is exposed by one or more applications.

17. The non-transitory computer readable medium of claim 16 wherein two or more of the parallel tracks are synchronized together at synchronization points.

18. The non-transitory computer readable medium of claim 15 wherein an output of one or more of the construct layers is provided to the at least one network traffic processing agent for execution.

19. The non-transitory computer readable medium of claim 18 wherein emulated network packet traffic is generated by the at least one network traffic processing agent.

20. The non-transitory computer readable medium of claim 15 wherein the user behavioral state machine construct layer, the business application logic state machine construct layer, and the message parsing state machine construct layer are configured to communicate data via filing of events.

* * * * *

UNITED STATES PATENT AND TRADEMARK OFFICE
CERTIFICATE OF CORRECTION

| | | |
|---|---|---|
| PATENT NO. | : 11,381,464 B2 | Page 1 of 1 |
| APPLICATION NO. | : 16/699358 | |
| DATED | : July 5, 2022 | |
| INVENTOR(S) | : Konstantin Belov et al. | |

It is certified that error appears in the above-identified patent and that said Letters Patent is hereby corrected as shown below:

On the Title Page

Item [30], insert -- Nov. 28, 2019 (RO) ............... a 2019 00814 --, as a new field entry.

Signed and Sealed this
Twenty-seventh Day of September, 2022

*Katherine Kelly Vidal*

Katherine Kelly Vidal
*Director of the United States Patent and Trademark Office*